Feb. 27, 1945.  E. G. BAKER  2,370,283
ROTARY VALVE
Filed Jan. 28, 1943   2 Sheets-Sheet 1

INVENTOR-
Erwin G. Baker

Feb. 27, 1945. E. G. BAKER 2,370,283
ROTARY VALVE
Filed Jan. 28, 1943 2 Sheets-Sheet 2
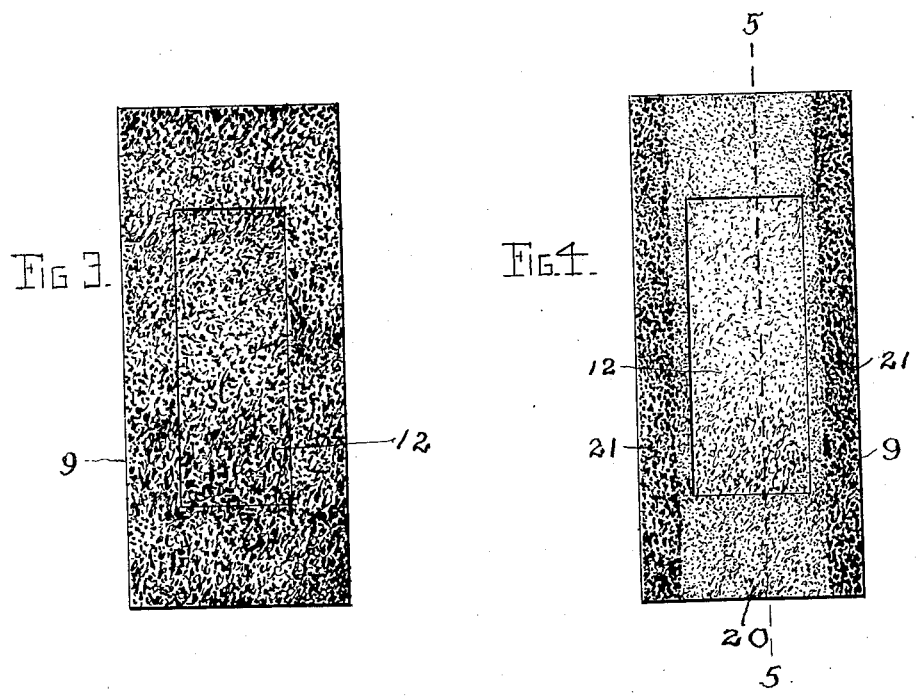
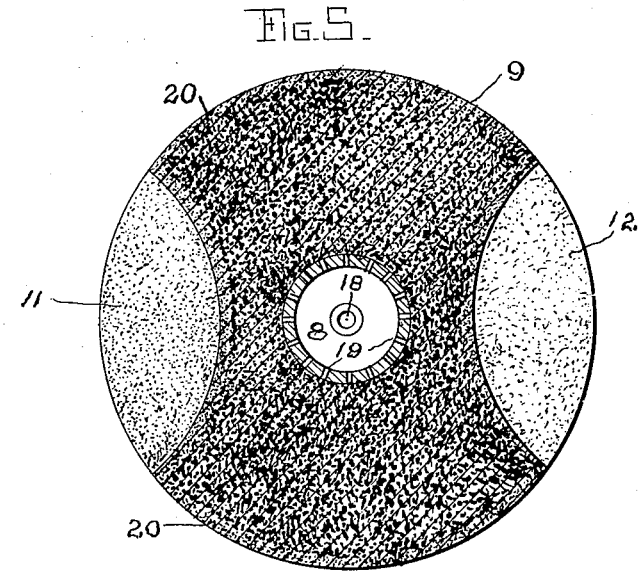
INVENTOR
Erwin G. Baker Patented Feb. 27, 1945

2,370,283

UNITED STATES PATENT OFFICE 2,370,283

ROTARY VALVE

Erwin G. Baker, Indianapolis, Ind.

Application January 28, 1943, Serial No. 474,056

5 Claims. (Cl. 123—190)

This invention relates to rotary valves designed to be used in connection with motors and more particularly to internal combustion motors and the prime feature of the invention is the provision of a non-metallic valve that will not be unduly expanded by the heat incident to combustion within the motor.

An additional feature of the invention is in constructing the valve of such material that the valve will be more or less porous whereby a constant flow of lubricant may be maintained through the interstices of the valve from its axis to the outer face thereof.

A further feature of the invention is the provision of means for injecting a constant flow of lubricant, under pressure, into the hub portion of the valve and thence outwardly through the pores of the valve to the outer peripheral surface thereof, the lubricant discharging from the outer face of the valve in the form of a sweat or mist.

A further feature of the invention is in employing a lubricant having carbonaceous elements, whereby when subjected to heat, a film will be carbonized or baked over that portion of the face of the valve coming in contact with the heat resultant from combustion within the motor and thus providing a smooth glazed substantially non-wearing surface around the valve.

A further feature of the invention is in so constructing the valve that a space adjacent each end of the valve will be left unglazed to provide exits for the lubricant exuding from the interior of the valve, said unglazed portions being out of direct line with the heat of combustion.

Other objects and advantages will be hereinafter more fully set forth and pointed out.

In the accompanying drawings which are made a part of this application,

Figure 3 is an edge elevational view of the valve before being applied to use.

Figure 4 is a similar view of the valve in its completed state, and,

Figure 5 is a sectional view thereof as seen along line 5—5, Fig. 4.

Figure 1:
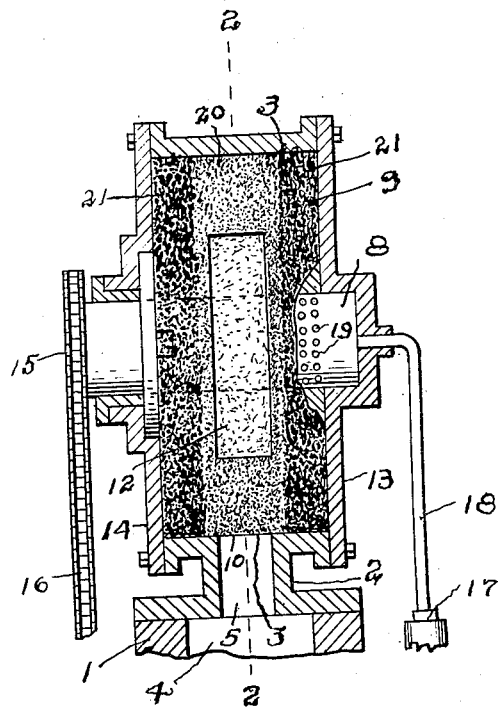
Figure 1 is a sectional view through the upper portion of an internal combustion motor showing my improved valve mounted therein.
Figure 2:
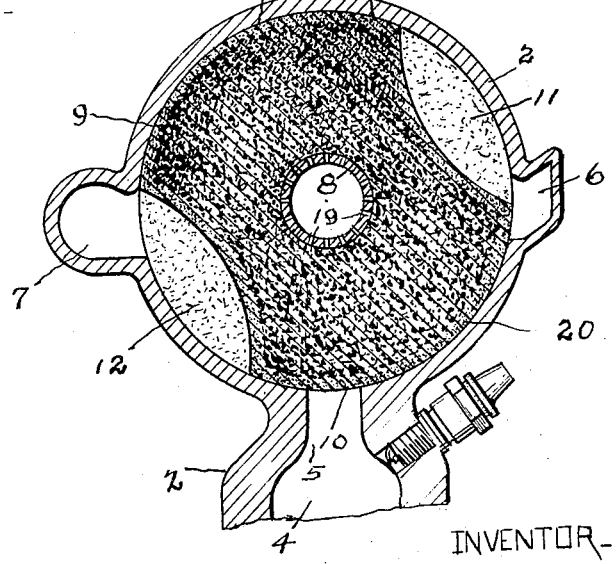
Figure 2 is a sectional view as seen along line 2—2, Fig. 1.

Referring to the drawings in which similar reference numerals designate corresponding parts throughout the several views, the numeral 1 indicates the cylinder block of a conventional form of internal combustion motor and 2 indicates the head portion of the motor, which is secured to the cylinder block 1 in any approved manner.

The head portion 2 is provided with a bore 3, which bore is connected to the cylinder 4 by means of a port 5, the head portion 2 also being provided with an intake port 6 and an exhaust port 7, as is common in motors of this class.

Extending axially through the bore 3 of the head 2 is a hollow shaft 8, upon which is mounted my improved form of rotating valve 9, which cooperates with a valve seat 10 at the upper end of the port 5, the peripheral face of said valve 9 having pockets 11 and 12 which intermittently register with the port 5, intake port 6 and exhaust port 7, incident to the rotation of the valve 9.

Great difficulty has been encountered with the employment of metal to metal and other forms of rotary valves in that they become so heated and expanded as to be inclined to stick and refuse to rotate and difficulty in properly lubricating the bearing surfaces is also met, due to the fact that the lubricant is thrown from the bearing surfaces by centrifugal force, permitting pitting of the bearing surfaces and accumulation of carbon on the bearing surface and causing disintegration of the valve.

To overcome these objectionable features and at the same time produce a valve substantially indestructible from use, I form the present valve 9 preferably of suitable comminuted particles of carbon which are shaped and compressed together and held in proper shape by any suitable binder.

After the particles forming the valve 9 have been molded and compressed into proper shape, any suitable carbon bearing lubricant is forced into the interstices or pores of the valve until all parts thereof are thoroughly saturated with the lubricant.

The valve 9 is mounted upon the hollow shaft 8 in fixed relation, the end portions of said shaft finding bearings in the end plates 13 and 14 of the housing 2, one end of the shaft 8 extending beyond its end plate 14 and has attached thereto a suitable driving gear 15, with which cooperates a chain mechanism 16, which in turn cooperates with and is driven from the conventional crank shaft (not shown) of the motor.

In order to constantly force a new supply of lubricant through the pores of the valve 9 to the outer peripheral face of the valve, any suitable form of pump 17 is provided and associated with the shaft 8 by means of a pipe 18, the pipe entering the open end of the shaft 8 through the plate 13 forming the bearing for the open end of said shaft and by providing the shaft with a plurality of openings 19, a uniform flow of lubricant will be carried through the pores of the valve, from its hub portion to the outer peripheral face thereof.

The valve 9 is preferably placed in its housing in an unpolished condition, or as shown in Fig. 3 of the drawings, as, after the motor has been run for a short period of time, a film will be formed over that portion of the peripheral face of the valve coming in direct contact with the heat incident to combustion and will solidify or bake to a polished finish, as indicated at 20, while that portion of the face at opposite edges of the valve, as indicated at 21, will remain more porous and permit the lubricant to exude in a mist or vapor. It will be understood, of course, that the film 20 may be formed on the valve before the valve is inserted in the housing 2 and applied to use, but owing to the rapidity at which the film will form incident to the operation of the motor, it is not deemed necessary to treat the valve face before it is applied to use.

One of the main obstacles encountered in valves of this nature is in obtaining proper lubrication for the peripheral or bearing face of the valve because lubricant applied exteriorly to the face of the valve is instantly thrown off by centrifugal force and the lubricating effect thereof lost, but by directing the lubricant through the pores of the valve, from its axis to its outer face and causing it to exude in a mist or sweat formation, the full lubricating effect of the lubricant is obtained and a constant covering of lubricant provided for the wearing face of the valve at all times.

There is a certain amount of oil thrown from the cylinder through the port 5 and this oil, together with the lubricant exuding from the peripheral face of the valve 9 will, when subjected to the intense heat caused by combustion within the cylinder, bake the film 20 on the face of the valve and should, for any reason, the baked film become scored or marred, such indentations will be quickly filled and healed over by the baking process and thus obliterated.

It will further be seen, that as the film forming process is continuous, so long as the motor is in operation, the wear on the valve face is compensated for and the life of the valve extended indefinitely and thus caused to last the life of the motor.

It will likewise be seen that by using a non-metallic valve structure within a metal casing, possibility of expansion to the extent that the valve will stick is overcome and the valve remain in condition to start its revolutions freely with a minimum of exertion in starting the motor.

In the present instance I have shown the motor as of a single cylinder construction, but it will be understood that the valve will operate with equal success with a motor having multiple cylinders.

What I claim is:

1. In a valve structure, a rotary valve formed from compressed carbon particles and having a central longitudinal bore, means for conveying lubricant to said central bore of said valve and thence outwardly in a uniform flow through all the interstices of the valve simultaneously to the outer peripheral face thereof, and means for causing said lubricant to exude in mist like formation at the peripheral extremity of the valve whereby incident to use a glazed film will be formed on the peripheral face of said valve and thus compensating for wear and for obliterating score marks.

2. A rotary valve structure comprising a valve proper formed by compressing together comminuted particles of carbon or the like, a hollow shaft extending axially through and fixed with said valve and having its ends closed to form a lubricant receiving chamber, said shaft having series of uniformly spaced openings so positioned that lubricant will be uniformly distributed to all parts of the valve, and a pump mechanism for supplying lubricant to the hollow shaft under pressure, whereby the lubricant will be forced through said openings and through the pores of the valve to the outer periphery thereof.

3. In a valve structure, a rotary valve formed by compressing together comminuted particles of carbon or the like, a hollow shaft centrally of said valve and fixed therewith, and having a plurality of series of openings extending through the wall of said shaft for conveying lubricant to all portions of said valve, means for closing the ends of said shaft for forming a lubricant receiving chamber, and a pump mechanism connected with one end of said lubricant receiving chamber for conveying lubricant into said lubricant chamber under pressure, and thence outwardly through said openings in the shaft and uniformly through all the pores of said valve from its hub portion to its outer peripheral face, whereby said lubricant will be delivered to the outer face of the valve in the form of mist.

4. In a valve structure, a rotary valve formed by compressing together comminuted particles of carbon or the like and having a longitudinal central bore, means for conveying lubricant to said bore under pressure whereby the lubricant will be forced uniformly through the pores of said valve to the outer peripheral face thereof and discharge therefrom substantially in the form of mist, whereby when the peripheral face of the valve is subjected to heat a glazed film will form on the face of the valve and such film be constantly rebuilt as the valve rotates for compensating for any wear and obliteration of any score marks.

5. In a valve structure, a rotary valve of porous carbon or the like having a central longitudinally extending bore therethrough, a hollow shaft fixed within said bore and having series of openings through its wall, the ends of said shaft being closed, a pump mechanism for forcing a constant flow of lubricant into said hollow shaft and forcing the same through said openings and the pores of said valve and causing said lubricant to discharge from the peripheral face of said valve substantially in the form of mist, whereby when said peripheral face of the valve is subjected to heat a glazed film will be formed on said face and be constantly rebuilt thereon as the valve is rotated for compensating for wear and for obliterating any score marks thereon, the film adjacent the ends of the valve face being less dense than at the central portion thereof.

ERWIN G. BAKER.